United States Patent Office 3,211,778
Patented Oct. 12, 1965

3,211,778
METHOD FOR PREPARING ACRYLONITRILE
DERIVATIVES
Janos Kollonitsch, Westfield, N.J., assignor to Merck &
Co., Inc., Rahway, N.J., a corporation of New Jersey
No Drawing. Filed Mar. 8, 1965, Ser. No. 438,039
7 Claims. (Cl. 260—465.6)

This is a continuation-in-part of my application Serial No. 110,890, filed May 18, 1961, and now abandoned.

This invention relates generally to a new and improved method of making alkali metal derivatives of 1-alkoxymethyl-2-hydroxyacrylonitrile. It relates further to a new and improved process for making 1-alkoxymethyl-2-alkoxyacrylonitrile from acrylonitrile or a β-alkoxypropionitrile.

It is known in the prior art that 2-loweralkyl-4-amino-5-methoxymethyl pyrimidines can be prepared by a process that comprises generally the condensation of a β-alkoxypropionitrile with an alkylformate in the presence of base, treatment of the resulting sodioformyl-β-alkoxypropionitrile with an alkylating agent to produce 1-alkoxymethyl-2-alkoxyacrylonitrile and reaction of the latter substance with an amidine to form a 2-loweralkyl-4-amino-5-alkoxymethyl pyrimidine. By the methods described heretofore, the yields of the desired products are very low and this process has, for that reason, not been an acceptable one for making the substituted pyrimidines. Hence, until the present invention, other chemical processes were generally employed for making 2-loweralkyl-4-amino-5-alkoxymethyl pyrimidines. These pyrimidines are intermediates in the syntheses of important compounds in the vitamin and antiparasitic fields. Thus, 2-methyl-4-amino-5-alkoxymethyl pyrimidines are useful intermediates in the synthesis of vitamin B-1. In addition, the reaction of 2-loweralkyl-4-amino-5-alkoxymethyl pyrimidines with α-picoline in the presence of excess hydrochloric acid leads to the formation of 1-(2-loweralkyl-4-amino-5-pyrimidinylmethyl)-2-methyl pyridinium chloride quaternary salts which are highly efficacious in treating the parasitic disease of poultry known as coccidiosis.

It is an object of the present invention to provide an improved synthesis of 1 - alkoxymethyl-2-alkoxyacrylonitrile. A more specific object of the invention is to provide a highly efficient method for making alkali metal salts of 1-alkoxymethyl-2-hydroxyacrylonitrile in high yields from either acrylonitrile or a β-alkoxypropionitrile. An additional object of the invention is the provision of such a process which is capable of being operated economically on a commercial scale. Other objects will be apparent from the ensuing description of the invention.

According to the present invention, it has now been found that the reaction of acrylonitrile or a β-alkoxypropionitrile with an alkylformate in the presence of an alkali metal alkoxide catalyst to produce an alkali metal salt of 1-alkoxymethyl-2-hydroxyacrylonitrile is significantly improved by carrying out such formylation reaction in the presence of carbon monoxide at superatmospheric pressure. This is in contrast to the previously described procedures for making 1-alkoxymethyl-2-hydroxyacrylonitrile, wherein the process was conducted at atmospheric pressure and the carbon monoxide, which is one of the reaction products, allowed to escape from the reaction medium.

In order to facilitate the discussion of this invention, a flowsheet setting forth the chemical reactions involved follows:

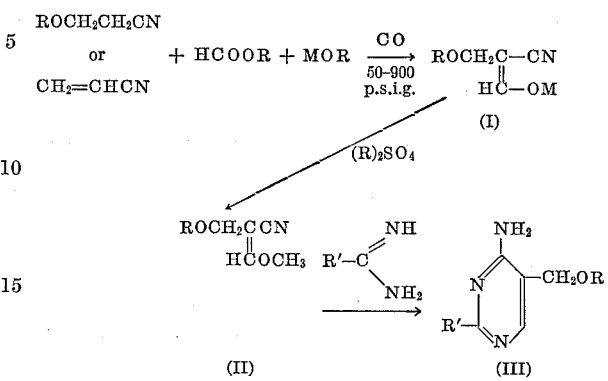

In this flow diagram R and R' represent lower alkyl radicals, where R and R' may be the same or different, and M is an alkali metal.

The first reaction in the process set forth above is the formylation of a β-alkoxypropionitrile in the presence of an alkali metal alkoxide to form a salt of 1-alkoxymethyl-2-hydroxyacrylonitrile (I). When speaking of this and of the subsequent reactions set forth above, reference will be made to the compounds wherein R is a methyl group and M is sodium. It should be emphasized, however, that such discussion of the invention applies equally in those instances where R is a lower alkyl radical other than methyl, e.g., ethyl, propyl, isopropyl, and M is an alkali metal other than sodium, e.g., potassium.

It will be noted from the above flow diagram that either β-methoxypropionitrile or acrylonitrile may be utilized as one of the starting materials. When acrylontrile is employed, an approximately equimolar amount of methanol is preferably used. Under these conditions the acrylonitrile and methanol react to form β-methoxypropionitrile which then enters into the reaction with methylformate to produce the desired sodioformyl-β-methoxypropionitrile. It is a preferred embodiment of the invention to employ acrylonitrile as one of the starting materials and and to generate or form the β-methoxypropionitrile in the reaction medium.

A critical and essential feature of this invention is that the initial reaction to produce the α-sodioformyl-β-methoxypropionitrile of Formula I is carried out in the presence of carbon monoxide at a super-atmospheric pressure of about 50 to about 900 p.s.i. (about 3.4–61 atmospheres). When the reaction is conducted under these conditions, the yields of desired product are significantly higher than those obtained when atmospheric pressure is employed. The required carbon monoxide pressure may be obtained in either of two ways. Carbon monoxide is one of the reaction products. It is a preferred aspect of the present invention that the reaction be carried out in a closed system and that the desired pressure be derived from the carbon monoxide generated in situ. In this way, the process is convenient and economical to operate. Under the preferred reaction conditions, where from 1.5 to 4 moles of methylformate are employed per mole of β-methoxypropionitrile or acrylonitrile, an internal carbon monoxide pressure of from 60–200 p.s.i. is generated, the particular pressure in a given instance depending on the overall reaction conditions and the excess of formylating agent employed. The pressure builds up rapidly after the reactants are mixed and then gradually diminishes as the reaction nears completion. Under the preferred conditions discussed below, pressures of 50–60 p.s.i. are generated by the time the reactants are completely mixed. This pressure increases up to 90–110 p.s.i. and then gradually decreases to about 50 p.s.i. at which time the reaction is substantially complete.

Alternatively, higher pressures can be achieved by the addition of carbon monoxide gas to the reaction medium. In this way pressures of up to about 900 p.s.i. can be employed with favorable effect on the yield of the nitrile (I). When this embodiment of the invention is utilized, the chosen pressure, which is preferably in the range of 700–900 p.s.i., is maintained relatively constant by periodic addition of carbon monoxide gas during the reaction period. The reaction is substantially complete when the pressure remains relatively constant.

The pressure reaction itself is preferably conducted in an inert solvent medium such as benzene, toluene or xylene in the presence of a slight molar excess of sodium methoxide. The formylation is conveniently conducted at temperatures of 20–30° C. until substantially complete as judged by the stabilizing of the internal pressure due to the carbon monoxide. This ordinarily requires from 10–20 hours.

The 1-sodioformyl-2-methoxypropionitrile (I) is normally present as a solid at the end of the reaction period. This substance is difficult to purify and is therefore normally used directly without isolation for preparing 1-methoxymethyl-2-methoxyacrylonitrile (II). This is accomplished by treating the formylation reaction mixture with dimethylsulfate at atmospheric pressure and at 30–60° C. The methylated nitrile (II) may be isolated without unusual difficulty in the absence of excess dimethylsulfate. For this reason, the yields are normally calculated on the basis of the 1-methoxymethyl-2-methoxyacrylonitrile obtained from acrylonitrile or β-methoxypropionitrile.

The final step in the process for making 2-loweralkyl-4-amino-5-alkoxymethyl pyrimidines comprises the reaction of 1-methoxymethyl-2-methoxyacrylonitrile with a loweralkyl amidine. This is conveniently brought about in an organic solvent medium such as a lower alkanol or an aromatic hydrocarbon, e.g., ethanol, propanol, isopropanol, benzene, toluene, xylene, by heating the two reactants in the solvent medium at temperatures of between about 60–120° C. for one to four hours. It is preferred to employ approximately equimolar amounts of the loweralkyl amidine and the 1-methoxymethyl-2-methoxyacrylonitrile reactants. The loweralkyl amidines such as acetamidine and butyramidine are normally obtained in the form of their acid salts and it is necessary to at least partially neutralize such salts with an appropriate base prior to reaction with the 1-methoxymethyl-2-methoxyacrylonitrile.

The following examples are given for the purpose of illustration and not by way of limitation:

*Example 1*

64 g. of β-methoxypropionitrile (0.752 mole) are mixed with 132 g. (2.18 moles) of methylformate and this mixture added to a suspension of 54.8 g. of sodium methoxide (equivalent to 0.97 mole) in 400 ml. of dry benzene in a steel rocking bomb of 1300 ml. capacity. The bomb is closed immediately and shaken at room temperature for about 20 hours. The internal pressure (due to carbon monoxide formation) rises to 70 p.s.i. in 4 hours and then slowly drops, reaching 40 p.s.i. at the end of 20 hours. The reaction vessel containing 1-sodioformyl-2-methoxy-propionitrile as a colorless, fine solid is then opened, and 93 ml. (0.973 mole) of dimethylsulfate added over a 10-minute period while stirring the reaction mixture and maintaining the temperature at 25–35° C. The resulting mixture is stirred at 50° C. for 3 hours. At the end of this time the solid sodium methylsulfate is removed by filtration and washed with 3 x 100 ml. of benzene. The combined benzene filtrates are freed of solvent by vacuum distillation below 50° C. 3 ml. of triethylamine is added and the solution re-filtered before the distillation is begun. 111.2 g. of a nearly colorless oil is obtained which contains, by ultraviolet analysis, 74.8 g. of 1 - methoxymethyl - 2 - methoxyacrylonitrile (78% yield). The ultraviolet analysis for 1-methoxymethyl-2-methoxyacrylonitrile is carried out by measuring absorption at 230 mμ in a methanol solution, the E% of pure material being 1060.

Although the material thus obtained above is suitable for reaction directly with a lower alkyl amidine to produce 2-loweralkyl-4-amino-5-methoxymethyl pyrimidine, it may be purified by distillation to give 70 g. of pure material, B.P. 85–88° C./2 mm.

When the above process is conducted in an open reaction vessel and the carbon monoxide formed during the first reaction allowed to escape, the yield of 1-methoxymethyl-2-methoxyacrylonitrile is 40% of the theoretical.

*Example 2*

When the process of Example 1 is carried out employing equimolar amounts of β-ethoxypropionitrile, ethylformate and sodium ethoxide there is obtained 1-sodioformyl-2-ethoxypropionitrile which, after treatment with dimethylsulfate as described in Example 1, yields 1-ethoxymethyl-2-methoxyacrylonitrile in a yield of 78% of theory, by ultraviolet analysis.

*Example 3*

16 g. of β-methoxypropionitrile (0.188 mole) and 32.8 g. of methylformate (0.545 mole) are added at once to a suspension of 13.7 g. of sodium methoxide (equivalent to 0.244 mole) in 100 ml. of benzene in a 300 ml. stainless steel rocking bomb. Carbon monoxide gas is passed into the reaction mixture to a pressure of 900 p.s.i. The bomb is then heated to 50° C. and rocking begun. The internal pressure is maintained at 900–920 p.s.i. by addition of fresh carbon monoxide as required at 30-minute intervals. After about 2 hours the pressure does not drop below 840 p.s.i. and no further carbon monoxide is added. 30 minutes after the last addition of carbon monoxide the pressure is released and the reaction mixture removed from the bomb. The bomb is rinsed with 30 ml. of benzene and this rinse added to the main reaction mixture. 25 ml. of dimethylsulfate is added and the mixture stirred for 2 hours at 50° C. The solid sodium methylsulfate is then removed by filtration and the filtrate evaporated to a constant weight in vacuo at a temperature less than 50° C. 26.4 g. of a light colored oil consisting substantially of 1-methoxymethyl-2-methoxyacrylonitrile is obtained which is 80% pure by ultraviolet analysis (88% yield).

When diethylsulfate is employed in place of dimethylsulfate in this process, 1-methoxymethyl-2-ethoxyacrylonitrile is produced.

*Example 4*

5.75 g. of sodium (0.25 mole) is melted and dispersed in 70 ml. of dry toluene. 14.5 g. (0.25 mole) of dry isopropanol is added and the mixture heated at 105° C. for about 50 minutes. The resulting gel of sodium isopropoxide in toluene is cooled to room temperature and washed with 30 ml. of toluene into a 300 ml. steel bomb. A mixture of 21.2 g. of β-isopropoxypropionitrile (0.188 mole) and 47.8 g. of isopropylformate (0.543 mole) is added, the bomb sealed and shaken at room temperature for 65 hours. The bomb is then opened and a thick mass of salt-like product is filtered and the solid washed with benzene and ether to give 27.4 g. of α-sodioformyl-β-isopropoxypropionitrile.

16.3 g. of this product in 73 ml. of benzene is treated with 12.1 ml. of dimethylsulfate, with stirring, at 50° C. for 3 hours. The benzene reaction mixture is then filtered and the filtrate concentrated to dryness in vacuo to give 1-isopropoxymethyl-2-methoxyacrylonitrile as an oil.

Example 5

A suspension of 23 g. (1 mole) of sodium in 400 ml. of toluene is heated to 105–110° C. with stirring, and then cooled slowly to 20–25° C. with stirring. To the resulting dispersion is added 32 g. of methanol over 10 minutes and the mixture boiled under reflux until the sodium is consumed. The suspension of sodium methoxide is cooled to 25° C. and transferred to a 1300 ml. rocking bomb. A mixture of 63.9 g. (0.75 mole) of β-methoxypropionitrile and 131 g. (2.18 moles) of methylformate is added and the mixture rocked autogenously at 25° C. for 18–20 hours. To the resulting suspension of 1-sodioformyl-2-methoxypropionitrile there is added 128 g. (1.01 moles) of dimethylsulfate over 15 minutes at 25–50° C. The mixture is heated at 50° C. for 2 hours, cooled to 25° C., filtered to remove sodium methylsulfate and the salt cake washed with toluene. 8 g. of anhydrous trimethylamine is added to the combined toluene filtrates. The solution is concentrated under reduced pressure (60° C.) to a volume of 300 ml., filtered to remove the solid tetramethylammonium methylsulfate, and concentrated further until essentially all of the toluene has been removed. 91.5 g. of 1-methoxymethyl-2-methoxyacrylonitrile is obtained which is about 84% pure by ultraviolet assay (yield=80%).

Example 6

14.8 g. of sodium methoxide (0.275 mole) is suspended in 125 ml. of benzene in a 200 ml. steel bomb. A mixture of 17 ml. of acrylonitrile (0.25 mole) and 19.1 ml. of methylformate (0.31 mole) is added, the bomb closed and carbon monoxide added to a pressure of 200 p.s.i. The bomb is shaken at room temperature for 3 days. The bomb is then opened and the reaction mixture removed. 1-sodioformyl-2-methoxypropionitrile is present as a light yellow solid. 30 ml. of dimethylsulfate is added and the mixture stirred at room temperature for 90 minutes and then at 50° C. for 3 hours. It is cooled to room temperature, filtered and the filtrate evaporated in vacuo at 50° C. to give a light colored oil of 1-methoxymethyl-2-methoxyacrylonitrile.

It will be seen from this experiment that addition of a lower alkanol is not essential when acrylonitrile is the starting material. The lower alkanol, in this case methanol, is generated in situ from the lower alkylformate and from the sodium lower alkoxide.

Example 7

To a rocking bomb of about 2 liters' capacity there is added 95 g. of sodium methoxide in 474 ml. of toluene. The mixture is cooled to about room temperature and 51 ml. of methanol added slowly, maintaining the temperature at 20–25° C. A mixture of 67 g. of acrylonitrile and 220 g. of methylformate is added to the reaction bomb over 1 hour in a closed system. The bomb is then agitated at 25° C. for about 17 hours. It is then cooled to about 15° C. and vented to the atmosphere. The reaction mixture is transferred to a vessel equipped with a stirrer and 233 g. of dimethylsulfate added over a 30-minute period, maintaining the temperature below 40° C. After this addition is complete, the mixture is stirred at 50° C. for 2 hours. It is then cooled to about room temperature and filtered. The solid material is washed with 530 ml. of toluene and the toluene wash combined with the main filtrate. 36 g. of trimethylamine are added to the combined toluene solutions and the mixture stirred for 1 hour at room temperature. The reaction mixture is then concentrated in vacuo at a temperature of less than 50° C. to a volume of about 350 ml. The solid present at this point is removed by filtration and the filtrate then concentrated to constant weight in vacuo. The residue thus obtained consists of 1-methoxymethyl-2-methoxyacrylonitrile. Yield based on acrylonitrile is 78%.

Example 8

5 g. of 2-propyl-4-amino-5-methoxymethyl pyrimidine (0.0275 mole), 10 ml. of 2-methyl pyridine (0.101 mole) and 50 ml. of xylene are placed in a 250 ml. flask equipped with reflux condenser, stirrer, thermometer and gas inlet tube. Hydrogen chloride gas is added to this mixture at a rate of 0.32 g. per minute for 23 minutes (0.2 mole). The temperature rises to about 67° C. The gas inlet tube is replaced with a distillation unit and the mixture heated at the reflux temperature (138° C.) for 2 hours during which time fresh xylene is added to replace the volume of liquid that distils. An additional 10 ml. of 2-methyl pyridine is added and the mixture refluxed for 40 minutes. At the end of the reflux period, the reaction mixture is cooled to 65° C., the xylene decanted and 25 ml. of acetonitrile added to the residue. The resulting mixture is stirred at room temperature for about 12 hours, filtered and the solid 1-(2-n-propyl-4-amino-5-pyrimidylmethyl)-2-methyl pyridinium chloride hydrochloride thus obtained washed with 10 ml. of acetonitrile and two 10 ml. portions of ether. 7.93 g. of product (91.2%) are obtained, M.P. 246–247° C.

Any departure from the above description which conforms to the present invention is intended to be included within the scope of the claims.

What is claimed is:

1. In the process of making 1-methoxymethyl-2-methoxyacrylonitrile by intimately contacting acrylonitrile and methylformate in a reaction medium containing sodium methoxide and methanol to form the sodium salt of 1-methoxymethyl-2-hydroxyacrylonitrile, and thereafter treating said sodium salt with dimethylsulfate, the improvement that comprises forming the sodio-1-methoxymethyl-2-hydroxyacrylonitrile in a closed system at a carbon monoxide pressure of from about 50–900 p.s.i.

2. The process of claim 1 wherein the carbon monoxide pressure is derived solely from carbon monoxide formed in situ in the reaction mixture.

3. In the process of making 1-loweralkoxymethyl-2-methoxyacrylonitrile by intimately contacting acrylonitrile and a lower alkyl formate in the presence of sodium lower alkoxide and a lower alkanol, and thereafter treating the resulting sodium derivative of 1-loweralkoxymethyl-2-hydroxyacrylonitrile with dimethylsulfate, the improvement that comprises forming the sodium derivative of 1-loweralkoxymethyl-2-hydroxyacrylonitrile in a closed system at a carbon monoxide pressure of from about 50–900 p.s.i.

4. The process of claim 3 wherein the carbon monoxide pressure is derived solely from carbon monoxide formed in situ in the reaction mixture.

5. In the process of making 1-methoxymethyl-2-methoxyacrylonitrile by intimately contacting β-methoxypropionitrile and methylformate in a reaction medium containing sodium methoxide, and thereafter treating the resulting sodium derivative of 1-methoxymethyl-2-hydroxyacrylonitrile with dimethylsulfate, the improvement that comprises forming the sodium derivative of 1-methoxy-methyl-2-hydroxyacrylonitrile in a closed system at a carbon monoxide pressure of from about 50–900 p.s.i.

6. In the process of making 1-loweralkoxy-methyl-2-methoxyacrylonitrile by intimately contacting β-loweralkoxypropionitrile and a lower alkyl formate in the presence of sodium lower alkoxide, and thereafter treating the resulting sodium derivative of 1-loweralkoxymethyl-2-hydroxyacrylonitrile with dimethylsulfate, the improvement that comprises forming the sodium derivative of 1-loweralkoxymethyl-2-hydroxyacrylonitrile in a closed system at a carbon monoxide pressure of from about 50–900 p.s.i.

7. In the process of making 1-loweralkoxymethyl-2-methoxyacrylonitrile by intimately contacting acrylonitrile and a lower alkyl formate in the presence of sodium lower alkoxide and a lower alkanol, wherein the lower alkanol is formed in the reaction mixture from the lower alkyl formate and the sodium lower alkoxide, and thereafter treating the resulting sodium derivative of 1-loweralkoxymethyl-2-hydroxyacrylonitrile with dimethylsulfate, the improvement that comprises forming the sodium derivative of 1-loweralkoxymethyl-2-hydroxyacrylonitrile in a closed system at a carbon monoxide pressure of from about 50–900 p.s.i.

No references cited.

CHARLES B. PARKER, *Primary Examiner.*

JOSEPH P. BRUST, *Examiner.*